J. D. SCOTT & E. C. VAN ALTENA.
PICTURE SLIDE DISPLAY APPARATUS.
APPLICATION FILED APR. 14, 1917. RENEWED MAR. 12, 1918.

1,282,298.

Patented Oct. 22, 1918.
2 SHEETS—SHEET 1.

Inventors:
John D. Scott,
Edward C. Van Altena,
by Spear, Middleton, Donaldson & Spear
Attys.

J. D. SCOTT & E. C. VAN ALTENA.
PICTURE SLIDE DISPLAY APPARATUS.
APPLICATION FILED APR. 14, 1917. RENEWED MAR. 12, 1918.
1,282,298.
Patented Oct. 22, 1918.
2 SHEETS—SHEET 2.
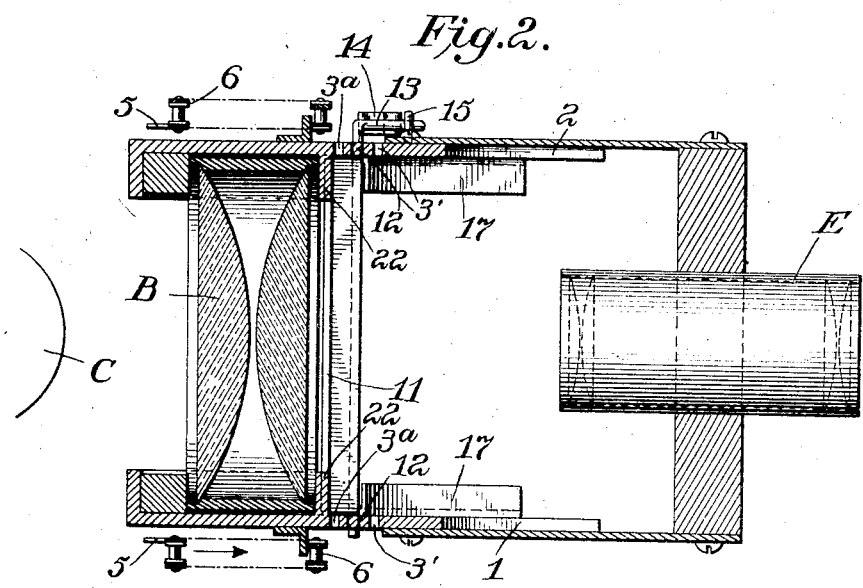
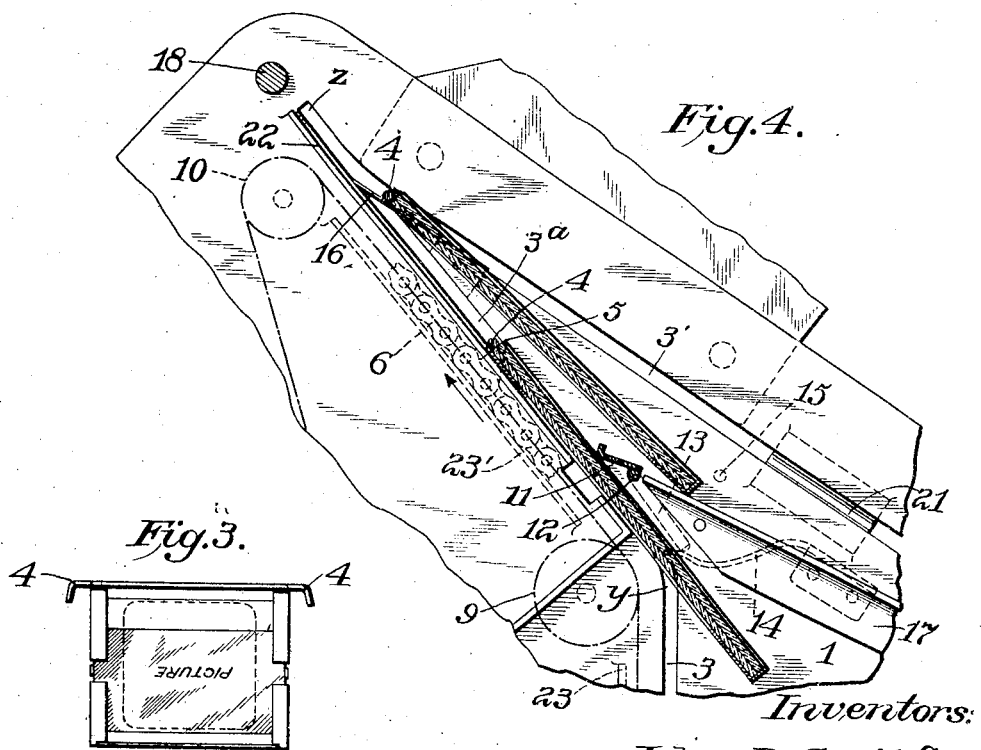
Inventors:
John D. Scott,
Edward C. Van Altena,

UNITED STATES PATENT OFFICE.

JOHN D. SCOTT AND EDWARD C. VAN ALTENA, OF NEW YORK, N. Y., ASSIGNORS TO ATTRACTOSCOPE CORPORATION, OF NEW YORK, N. Y.

PICTURE-SLIDE-DISPLAY APPARATUS.

1,282,298.

Specification of Letter Patent.

Patented Oct. 22, 1918.

Application filed April 14, 1917. Serial No. 162,145. Renewed March 12, 1918. Serial No. 222,047.

*To all whom it may concern:*

Be it known that we, JOHN D. SCOTT and EDWARD C. VAN ALTENA, citizens of the United States, residing at New York, N. Y., respectively, have invented certain new and useful Improvements in Picture-Slide-Display Apparatus, of which the following is a specification.

Our invention relates to apparatus for moving picture slides to a display point from a magazine containing two or more of the slides and returning them to the display point after a prescribed display period has elapsed, the apparatus operating automatically when suitable power is applied thereto, to move the slides *seriatim* to the display point and return them to the magazine or holder.

The invention consists in the features and combination and arrangement of parts hereinafter described and particularly pointed out in the claims.

In the accompanying drawings—

Fig. 2 is a sectional plan view.

Fig. 3 is a view of one of the picture slides.

Fig. 4 is a detail view of the supporting shelf for the slides, indicating the manner in which this shelf operates in connection with the slides.

Figure 1:
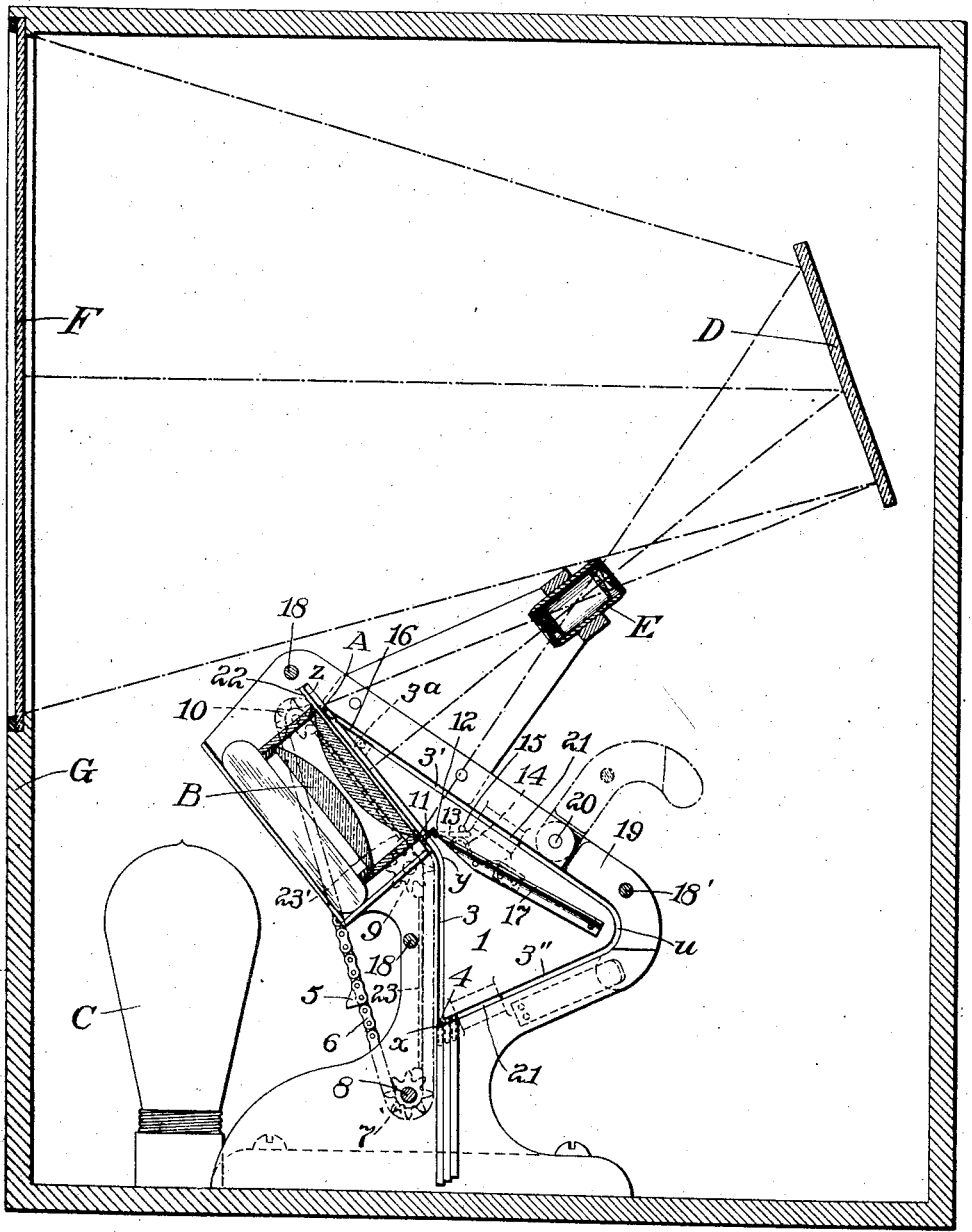
Figure 1 is a vertical sectional view of the apparatus with parts in elevation.

The apparatus comprises a framework made up of sides 1, 2, each of said sides having a channel or way in the form of a slot 3 for directing the slides in their course of travel. The slides are of the form shown in Fig. 3 and comprise projections or supports 4 at the upper parts or edges of the slides by which they are hung in the apparatus and with which contact is made by the operating or transporting mechanism to move the slides from place to place, the said supports or projections extending out through the slots 3 while the body of the slide lies and moves between the sides of the frame 1 and 2. It will be observed that the slot or way 3 extends substantially vertically from the point $x$ to the point $y$ and deflects at an angle to the point $z$ where this slot or way merges into the end of another slot or way 3', which is formed in each of the sides and this slot or way 3' extends downwardly at an inclination to the point $u$ where it merges by a curved portion into the return slot or way 3'', which extends at a downward inclination back to the point $x$ where it connects with the vertical part of the slot or way 3. The slides, as above stated, are hung between the sides of the frame by their projections 4 extending out through the slots or ways and we have shown, in Fig. 1, only three of such slides, these resting upon the wall of the slot 3''. The slide at the left rests in line with the vertical ways or slots 3 and in position so that the projections 4 thereof may be engaged by lifting means consisting, in the present example of my invention, of lugs 5 mounted on endless carriers in the form of chains 6 which pass around lower sprocket wheels 7 on a shaft 8 mounted in the sides of the frame, the chains then passing vertically parallel with the vertical portions of the slots or ways 3 and close thereto, so that the lugs 5 will engage the projections 4 of the left hand slide shown in Fig. 1, and elevate it from its stored position, or out-of-use position, so as to carry it to the display point. The vertical stretch of the chain passes over sprocket wheel 9 and thence at an inclination the chain passes to and over the sprocket wheel 10, these sprocket wheels 9 and 10 being journaled on stub axles or pins on the outer side of the frames 1 and 2. The chain, after passing the upper sprocket 10 extends downwardly at an inclination to pass under the lower sprocket 7. Power may be communicated to the apparatus by a motor connected up with the shaft 8 or a spring power device or a hand power device may be employed.

Just beyond the turn at the point $y$, a shelf 11 is located extending across the inclined portion of the guiding slots or ways, this shelf being movably mounted to clear the slots or ways for the onward passage of the slides when lifted by the chains. While this shelf may be variously arranged, it is preferably located so as to extend at substantially right angles across the guide ways or slots and preferably it is pivotally mounted at 12 and at one end it is provided with an extension or arm 13 which is pressed by a spring 14 so that the shelf will normally rest in its right angular relation to the slot or guide way and across the same. The shelf is arrested in this position by the arm 13 coming against a stop 15. At the upper ends of the inclined portions of the guide ways or slots where they merge into the end of the guide ways or slots 3', suitable switch means are provided so that when a slide is lifted to its upper limit it will pass the said switch means and will be deflected thereby into engagement with the guide way 3' during the descent or return movement of the slides. This switch means may be provided in a simple manner by leaf springs 16 extending from the lower wall of the slots 3' across the inclined portions 3ª.

On the inner side of the frames or side walls 1 and 2, tracks or guide rails 17 are mounted to control the lower edges or portions of the picture slides in their descent back to the magazine or point of rest. The sides of the frame may be tied together by any suitable means, as tie rods 18. It will now be observed that the lugs 5 of the chains, by engaging the projections 4 of the slides, will elevate the same and carry the upper edges of the slides into contact with the shelf 11 extending across the guide ways and will tilt this shelf so that the slide can proceed to its limit of movement, indicated in Fig. 1 approximately at A, and as soon as the lower edge of the slide gets above the shelf and the lug of the chain frees the slide by passing away therefrom, the said slide will drop back upon the shelf, which has in the meantime assumed its holding position extending across the guide ways. In other words, the picture slide is moved by the chains to a point where its lower edge is at a little distance above the normal position of the shelf 11, so that this shelf will return to its normal position under the action of the spring 14 and thereupon the chains passing over the upper sprockets 10 will cause a movement of the lugs 5 away from the projections 4 of the picture slide and this will be released to fall upon the shelf. In this elevating movement the slide will be carried to a point at which the projections 4 will pass above the spring switches 16 and these spring switches, having been pressed aside by the projections, will be returned to normal position to close the slots 3ª against downward movement of the said projections along the same and these projections will now be so located that when the slide is set free to fall by gravity its projections will necessarily be caused to move along the slots or ways 3' because of the position assumed by the spring switches. When the slide is at the position resting on the shelf 11, it is at the display point, the lenses being indicated generally at B and the light at C. The image is projected onto a mirror D by the objective E and this mirror reflects the image upon a suitable screen, indicated at F. The slide rests at the display point while the chains in their movement bring the lugs thereon to engage the projections 4 of the next slide in the magazine or holder and until this second slide is lifted into engagement with the underside of the shelf, causing this shelf to tilt, as above described, but having the effect of deflecting or discharging the lower edge of the slide which has been resting at the display point from off the shelf, so that it will now fall by gravity away from the display point. This action is illustrated in Fig. 4. In falling away from the display point the movement of the used slide is controlled by the guides or slots 3' with which the projections 4 of the slide engage and also by the tracks or guide bars 17, upon which the lower edges of the slides rest. The used slide is thus deflected so as not to interfere in any manner with the slide which is in course of upward movement. The used slide, after it passes away from control of the guide bars or tracks 17, is controlled in its final movement by the slots or ways 3'', being supported therein by the projections 4 extending through these slots. The used slide is thus directed back to the storage point to lie against the slide already stored, or if only two slides are being employed the used slide will assume a position against the left hand wall of the slot 3 and in line with said vertical slots or ways ready to be engaged by the projections 5 of the chains when they come around.

The present apparatus does not depend for its operation upon any certain number of slides being used. Each slide will store itself in proper position without being influenced by any guiding function exerted by any other slide and the apparatus will work continuously with two slides as well as with a greater number.

In order to remove any slide or to fill the apparatus, we employ movable sections 19 of the framework, said sections being pivoted at 20 and each section forming one wall of the guide way adjacent which it is located. The movable sections at the opposite sides of the framework are connected together to move in unison by a cross tie 18' and any suitable latch arrangement may be provided to hold this movable portion of the guide way in place. By throwing the movable sections into position, shown in dotted line in Fig. 1, any slide may be removed or replaced. The parts of the framework may be strengthened by bridge pieces, indicated generally at 21, which tie together the portions of the framework on the opposite sides of the slots or ways and these bridge pieces may be cast with the frames.

The apparatus may comprise a box or container G, within which the parts above described are located, and it will be seen that the receiving screen or ground glass F is located on one side of this box while the mirror D is located on the opposite side of the box, the slide operating mechanism being located at about the vertical center of the box or container. By using an inclined mirror D and by projecting the picture up to said mirror at an angle, or, in other words, by angularly positioning the picture slide at the display point, the rays will be projected first to the right, that is upon the mirror, and will then be reflected toward the left upon the screen. By this arrangement a large screen may be employed with a box or container of minimum dimensions and by projecting the rays first in one direction and then in the other above the elevating apparatus, great saving in space is attained and only one mirror need be employed by inclining this as shown. The inclination of this mirror is such that the reflected rays pass close above the apparatus and thus space is saved.

Ledges or tracks 22 extend inwardly from the side frames 1 and 2 and at a point above the supporting shelf 11, and these are inclined to correspond with the incline of the slot 3ª and in fact they extend along the lower border of this slot from in line with the point where the chains turn around the sprockets 9. These ledges receive the slides as they are carried past the sprockets 9 and thus position them in inclined relation at the display point.

The elevating chains are backed by ledges or flanges 23, 23' to hold the chain to its work.

While we have shown and described the projections 4 on the picture slides as performing the two fold function of hanging the slides in the guide ways and also serving as the means for engagement by the lugs on the elevating chains, it will be understood that we do not limit ourselves in this respect, as the projections may perform the first function of guiding and hanging the slides in the guide ways and the elevating means may engage a portion of the slides other than the projections.

We claim:

1. A display apparatus for picture slides comprising a magazine for the slides, guide ways extending therefrom to a display point for the slides, a rest for the slides normally lying across said guide ways and holding the slides singly at the display point, means for mounting the rest to permit movement of the same from across the guide ways, said rest being moved during the oncoming travel of the new slide to discharge the used slide and permit the passage of the new slide above it to rest thereon alone, downwardly inclined tracks to receive the used slides when discharged by the movement of the rest, and to direct them back to the magazine and means for elevating the slides, substantially as described.

2. A display apparatus for picture slides comprising a magazine for the slides, guide ways extending therefrom to a display point for the slides, a rest for the slides normally lying across said guide ways and holding the slides singly at the display point, means for mounting the rest to permit movement of the same from across the guide ways, said rest being moved by contact therewith of the upper part of said oncoming new slide to discharge the used slide and permit the passage of the new slide above it to rest thereon alone, downwardly inclined tracks to receive the used slides when discharged by the movement of the rest, and to direct them back to the magazine and means for elevating the slides, substantially as described.

3. A display apparatus for picture slides comprising a magazine, guide ways extending upwardly therefrom, a rest normally lying across said guide ways and holding the slides singly at the display point, means for mounting the rest to permit movement of the same from across the said guide ways, to discharge the used slide and permit the passage of the new slide to a point above it to occupy the place of the discharged slide, means for elevating the slide and automatically disconnecting therefrom when it reaches a point with its lower edge above the rest to position itself by gravity on said rest, said rest when operated moving the lower edge of the used slide laterally, and a guide way for immediately receiving the used slide when so moved to fall away by gravity leaving the new slide alone at the display point and on said rest, substantially as described.

4. In combination in a display apparatus for picture slides, a magazine for slides, guide ways extending upwardly therefrom, a rest normally lying across said guide ways, to support the slides singly at the display point, a pivotal mounting for the said rest to permit it to move from across the said guide ways, said rest being struck by the upper part of the new slide to be moved aside to discharge the used slide and allow the new slide to pass entirely above it, to rest thereon, by gravity, elevating means for the slides automatically disconnecting therefrom when they are raised to a point with their lower edges above the rest, and guide means for immediately receiving the used slide when the rest is tilted to direct the said used slide back to the magazine, substantially as described.

5. In combination a plurality of picture slides, a frame having guide ways in which the slides are hung from their upper ends, elevating means for the slides to carry them to the display point, and a shelf movably mounted and permitting the slides to pass above the same and rest thereon, the used slide being discharged by the movement of the shelf during the oncoming movement of the new slide, said shelf holding said slides singly at the display point, substantially as described.

6. In combination a plurality of picture slides, a frame having guide ways engaged by the upper portions of the slides, the portion of said guide ways at the display point extending at an inclination to hold the slide in inclined position, a shelf movably mounted at the lower part of said inclined guide ways and extending across the same to support the slides singly at the display point, said shelf being moved during the oncoming movement of the slide being elevated and by its movement discharging the used slide from the display point, substantially as described.

7. In combination a plurality of picture slides, a frame having guide ways at an inclination at the display point, and guide ways at a different inclination for the return of the used slides to their point of storage, said inclined guide ways merging into each other at their upper ends, said slides having projections at their upper ends entering said guide ways, by which the slides are hung in the guide ways and will be separately controlled in their movements, elevating means for the slides, and a shelf for supporting the slides at the display point, said shelf being movably mounted to retract from across the guide way and operated during the oncoming movement of a new slide, to move and discharge the used slide, substantially as described.

8. In combination a plurality of picture slides, a frame having guide ways at an inclination at the display point, and guide ways at a different inclination for the return of the used slides to their point of storage, said inclined guide ways merging into each other at their upper ends, said slides having projections at their upper ends entering said guide ways, by which the slides are hung in the guide ways and will be separately controlled in their movements, elevating means for the slides, and a shelf for supporting the slides at the display point, said shelf being movably mounted to move from across the guideway and operated during the oncoming movement of a new slide, to move and discharge the used slide, said elevating means engaging the projections on the slides, substantially as described.

9. In combination in a display apparatus, a plurality of picture slides, a frame having vertical guide ways with inclined extensions thereof at their upper ends, inclined guide ways merging with those first mentioned for the return of the slides from the display point at which the first mentioned inclined guides are located, the said slides having projections at their upper ends entering said guides to control the movement of the slides and to hang the slides separately in said guide ways and elevating means to engage the slides, said elevating means conforming in its path to the vertical guide ways and the inclined extensions thereof at the display point and a shelf at the lower end of the inclined guides first mentioned to hold the slides at the display point, said shelf being movably mounted to discharge the used slides and being operated during the oncoming movement of the new slide, substantially as described.

10. In combination in a picture display apparatus, a frame having vertical guide ways with inclined extensions thereof at the display point and ledges bordering the said inclined guide ways to afford a rest for the picture slides when at the display point, said frame having inclined guides extending from the upper ends of those first mentioned for the return of the slides, said picture slides having projections at their upper portions entering the guide ways and the return inclined guides merging into reversed inclined guides at their lower ends which reversed inclined guides extend to the lower ends of the vertical guides and a shelf at the lower portion of the inclined guides first mentioned for supporting the slides at the display point, said shelf being movably mounted and operating to discharge the used slide and permit the passage of the new slide to a point above it, substantially as described.

11. In combination in a picture display apparatus, a plurality of picture slides having projections at their upper portions, a frame having inclined guides for holding the slides at the display point in inclined position, inclined guides merging into those first mentioned for returning the slides to their point of storage, a shelf for supporting the slides at the display point, said shelf being movably mounted to discharge the used slides and permit the passage of the oncoming new slide and a track for receiving the lower portion of the discharged slides while their upper portions are controlled by the projections thereon moving in the return inclined guides, substantially as described.

12. In combination a plurality of picture slides having projections at their upper portions, a frame having vertically extending guides receiving said projections, said guides merging into inclined guide portions at the display point, return inclined guides, a shelf extending across the guides at the lower portion of the inclined guides, said shelf holding the slides at the display point, an elevating chain having a vertical stretch with an incline stretch starting from a point adjacent the shelf and extending to the upper part of the inclined guide and thence to the lower portion of the vertical guide, substantially as described.

13. In combination in a picture display apparatus, a plurality of slides having projections at their upper ends, a frame having guide ways receiving said projections and for holding the slides in inclined position at the display point, return incline guides for directing the slides to their point of storage by gravity, said return guides merging into the upper ends of the incline guides at the display point and switch means located at the junction of the two sets of inclined guides to control the movement of the projections from one to the other, subtantially as described.

14. In combination in a picture display apparatus, a plurality of slides, means for holding said slides in inclined position at the display point, a mirror arranged at a point elevated in respect to the slide rest and inclined in respect to the axis of the slide when at said display point, said mirror being located off to one side of the vertical plane in which said rest is located and a screen arranged at an elevated point in respect to the slide at the display point, so that the reflected rays may pass to said screen above the slide, substantially as described.

15. In combination in a picture display apparatus, a rest for the picture slides arranged in inclined position at the display point, a mirror arranged above and to one side of the said rest and at an inclination to the axis of projection of the picture and a screen arranged at an elevated point in respect to and upon the other side of the said rest from that upon which the mirror is located, substantially as described.

16. In combination in a picture slide display apparatus, a frame having guide ways to direct the slides to the display point, slides having projections at their upper ends moving in said guide ways by which the upper ends of the slides are controlled, guide ways for returning the slides to the point of storage, said projections moving in said guide ways during the return movement of the slides, means for guiding the lower portions of the slides in their returning movement and a shelf for holding the slides at the display point, said shelf being movable to discharge the used slide and permit the new slide to pass above it, substantially as described.

17. In combination in a picture slide display apparatus, a frame having guide ways to direct the slides to the display point, slides having projections at their upper ends moving in said guide ways by which the upper ends of the slides are controlled, guide ways for returning the slides to the point of storage, said projections moving in said guide ways during the return movement of the slides, means for guiding the lower portions of the slides in their returning movement and a shelf for holding the slides at the display point, said shelf being movable to discharge the used slide and permit the new slide to pass above it, and switch means for directing the slides from one set of guides to the other, substantially as described.

In testimony whereof, we affix our signatures.

JOHN D. SCOTT.
EDWARD C. VAN ALTENA.